(12) United States Patent
Volmer et al.

(10) Patent No.: US 9,543,774 B2
(45) Date of Patent: Jan. 10, 2017

(54) SUPPLY CIRCUIT IN A COMMUNICATION SYSTEM OF A PROTECTIVE HEADGEAR, PROTECTIVE HEADGEAR WITH SUCH A SUPPLY CIRCUIT AND METHOD FOR OPERATING SUCH A SUPPLY CIRCUIT

(71) Applicant: Dräger Safety AG & Co. KGaA, Lübeck (DE)

(72) Inventors: Achim Volmer, Lübeck (DE); Henning Ritter, Lübeck (DE); Erik Deier, Trittau (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 633 days.

(21) Appl. No.: 14/032,386

(22) Filed: Sep. 20, 2013

(65) Prior Publication Data
US 2014/0082829 A1 Mar. 27, 2014

(30) Foreign Application Priority Data
Sep. 22, 2012 (DE) .......... 10 2012 018 799

(51) Int. Cl.
| | |
|---|---|
| H02J 1/00 | (2006.01) |
| H02J 3/00 | (2006.01) |
| H02J 7/00 | (2006.01) |
| H02M 3/156 | (2006.01) |
| A42B 3/30 | (2006.01) |
| H02M 3/155 | (2006.01) |

(52) U.S. Cl.
CPC .............. *H02J 7/0065* (2013.01); *A42B 3/30* (2013.01); *H02J 7/00* (2013.01); *H02M 3/156* (2013.01); *H02M 3/155* (2013.01)

(58) Field of Classification Search
CPC ............ H02J 7/00; H02J 7/0065; A42B 3/30; Y10T 307/685
USPC .......................................................... 307/77
See application file for complete search history.

(56) References Cited

U.S. PATENT DOCUMENTS

| | | |
|---|---|---|
| 5,463,693 A | 10/1995 | Birli et al. |
| 5,590,419 A | 12/1996 | Shimo |
| 5,623,523 A | 4/1997 | Gehrke |
| 5,929,776 A | 7/1999 | Warble et al. |
| 6,574,126 B1 | 6/2003 | Gionet, Jr. |
| 2004/0080890 A1* | 4/2004 | Ramsay ........... H02H 9/008 361/93.1 |
| 2005/0096096 A1 | 5/2005 | Birli et al. |
| 2006/0202746 A1 | 9/2006 | Chen et al. |

(Continued)

FOREIGN PATENT DOCUMENTS

| | | |
|---|---|---|
| CN | 1581720 A | 2/2005 |
| CN | 102572636 A | 7/2012 |

(Continued)

*Primary Examiner* — Carlos Amaya
(74) *Attorney, Agent, or Firm* — McGlew and Tuttle, P.C.

(57) ABSTRACT

A power source (30, 32) supply circuit (28) is provided in a communication system of protective headgear for supplying a communication system from a power source (30, 32) associated with the protective headgear. The supply circuit (28) includes a boost converter (44) for better utilization of the electric power supplied by the power source (30, 32). Protective headgear is provided with such a supply circuit (28) for supplying the protective headgear. A method is also provided for operating such a supply circuit (28).

16 Claims, 6 Drawing Sheets

(56) References Cited

U.S. PATENT DOCUMENTS

| | | | |
|---|---|---|---|
| 2006/0277666 A1* | 12/2006 | Gertsch | A42B 3/04 |
| | | | 2/424 |
| 2009/0303698 A1* | 12/2009 | Huss | A42B 3/0433 |
| | | | 362/105 |
| 2010/0123614 A1 | 5/2010 | Nilsson | |
| 2012/0190314 A1 | 7/2012 | Glezerman et al. | |
| 2013/0155564 A1* | 6/2013 | Schmidt | H02H 9/008 |
| | | | 361/93.9 |

FOREIGN PATENT DOCUMENTS

| | | |
|---|---|---|
| DE | 196 18 532 A1 | 11/1997 |
| DE | 20 2004 018 538 U1 | 2/2005 |
| DE | 202006003348 U1 | 7/2006 |
| DE | 10 2006 010 528 A1 | 9/2006 |
| DE | 10 2008 035 162 A1 | 2/2010 |
| EP | 2295098 B1 | 10/2011 |
| FR | 2 908 534 A1 | 5/2008 |
| GB | 2 336 955 A | 11/1999 |
| JP | 11-38061 A | 2/1999 |
| TW | 200945742 A | 11/2009 |

* cited by examiner

Fig. 2 State of the Art
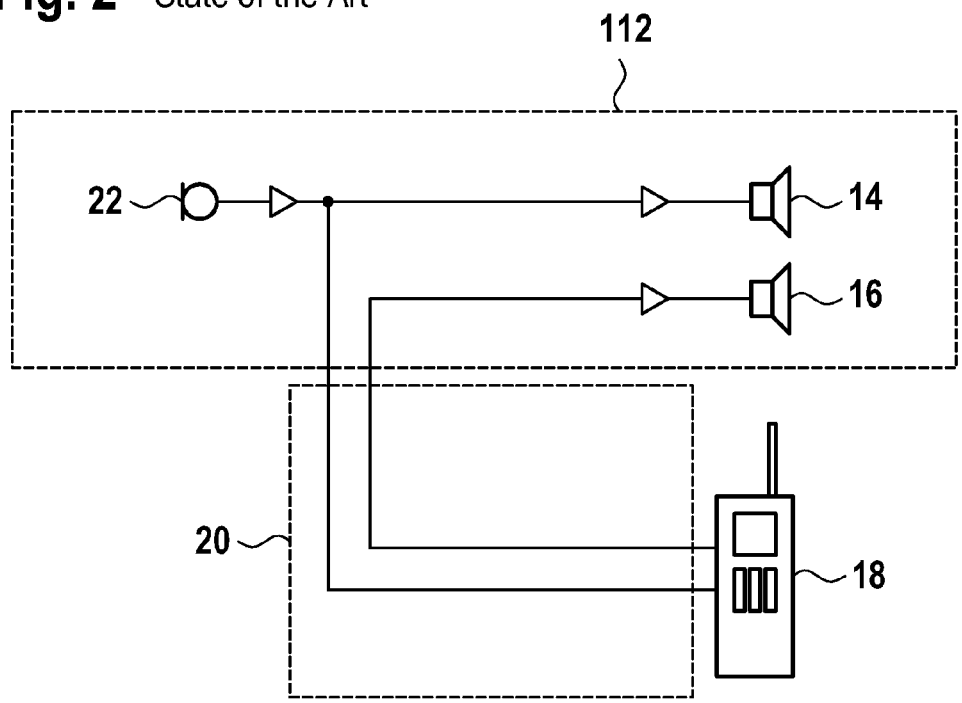
Fig. 3 State of the Art
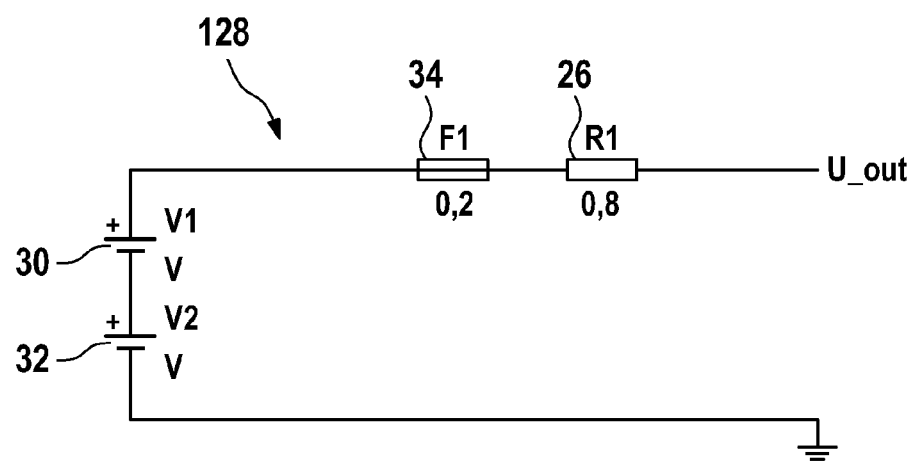

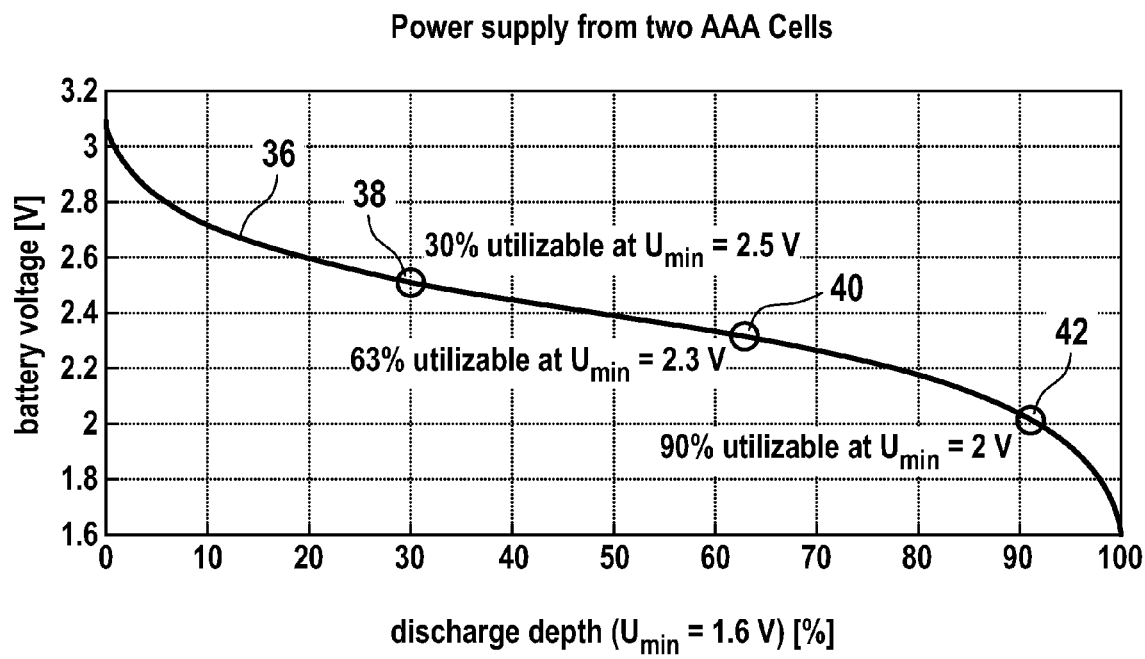

SUPPLY CIRCUIT IN A COMMUNICATION SYSTEM OF A PROTECTIVE HEADGEAR, PROTECTIVE HEADGEAR WITH SUCH A SUPPLY CIRCUIT AND METHOD FOR OPERATING SUCH A SUPPLY CIRCUIT

CROSS REFERENCE TO RELATED APPLICATIONS

This application claims the benefit of priority under 35 U.S.C. §119 of German Patent Application DE 10 2012 018 799.8 filed Sep. 22, 2012, the entire contents of which are incorporated herein by reference.

FIELD OF THE INVENTION

The present invention pertains to a supply circuit in a protective device also called hereinafter sometimes protective headgear for short in the form a face mask or full face mask, as well as in the form of helmets or escape hoods, as they are used, for example, by firefighters. The present invention specifically pertains to a supply circuit in a communication system of such protective headgear and, furthermore, also to protective headgear with such a supply circuit as well as to a method for operating such a supply circuit.

BACKGROUND OF THE INVENTION

Firefighters or members of comparable rescue teams are confronted with various situations. The spectrum ranges from technical assistance over firefighting to the use of hazardous materials. Different components are needed for personal protection. Heavy respirators are used in firefighting, using, for example, full-face mask (full breathing mask) combined with a compressed air breathing apparatus or a closed-circuit respirator.

Besides the protection from smoke poisoning or the like, the members of rescue teams also require adequate communication. They work alone or in teams of two during missions depending on the needs. The communication with the mission leader and within the team is absolutely necessary for a smooth mission. The use of analog or digital radio equipment is known. A marked improvement compared to working with a manual radio equipment is offered by the integration of the radio equipment in the corresponding protective headgear in the form of a headset solution. This is known, for example, from U.S. Pat. No. 5,463,693 B. A microphone for receiving speech signals is integrated in this case in the mask and a received speech signal is transmitted by means of a loudspeaker acting as an earphone.

The need for a power source that can be carried along and that is usually designed in the form of primary batteries, i.e., non-rechargeable batteries, is problematic in such communication systems. Depending on the power demand, service lives of about 8 hours can be reached. This represents a considerable effort in terms of work and testing for users of such protective headgear, especially for firefighters, as well as equipment maintenance staff, because the power sources of such communication systems must be tested regularly in respect to the corresponding state of charge and new batteries may have to be inserted.

SUMMARY OF THE INVENTION

Based on this state of the art, one object of the present invention is to provide a supply circuit that can be used in protective headgear of the type defined above and that permits longer operating times of the communication system based on the supply circuit and thus longer uses of the corresponding protective headgear and longer maintenance cycles.

This object is accomplished according to the present invention with a device of the type mentioned in the introduction with a boost converter comprised by the supply circuit. The boost converter is provided for this in the supply circuit arranged in a communication system of protective headgear for supplying the communication system from a power source associated with the protective headgear.

Boost converters are known per se. Thus, the use of a boost converter for portable electronic devices, for example, portable cell phones, has become known from GB 2 336 955 A, in which the boost converter is said to make possible a better utilization of an electric power being stored in a battery of the corresponding electronic device.

The use of a boost converter in a supply circuit for supplying a communication system of protective headgear has not yet become known. The advantage of the present invention is that longer operating times and hence also longer mission times are possible with the use of a boost converter in such a supply circuit. In addition, the amount of batteries to be disposed of is reduced and longer maintenance cycles for testing the corresponding power sources are possible in connection with the better utilization of the electric power being stored in the power source, especially a battery or a storage battery, which is associated with the protective headgear.

Provisions are made in one embodiment of the supply circuit for this supply circuit to have a voltage limitation means on the output side. This voltage limitation means limits the maximum occurring voltage at the output of the supply circuit and prevents in this manner the formation of a spark or the like and is thus effective in avoiding explosion hazards.

A Zener diode or a parallel connection of a plurality of Zener diodes is considered for use as a voltage limitation means. A Zener diode is known to also become conductive in the original non-conducting direction above a breakdown voltage, so that the resulting current can flow off over individual Zener diodes or a plurality of Zener diodes in case of an excessively high output voltage generated by the boost converter and the output voltage is thus effectively reduced to a permissible level that is not critical in respect to explosion hazards. In case of an optional plurality of Zener diodes, these are connected in parallel to one another and thus act as redundant voltage limitation means. Defects or tolerances of the Zener diodes can thus be prevented from affecting or preventing the effectiveness of these Zener diodes as voltage limitation means. At the least, the probability of malfunctions based on such defects can be considerably reduced. For example, a Zener diode that also has a high ohmic resistance for a long time in the non-conducting direction could not be effective as a voltage limitation means. If such a defective Zener diode is in a parallel connection with at least one Zener diode functioning as intended, the parallel connection can assume the function of a voltage limitation means despite the defective Zener diode that said parallel connection comprises. The more redundant Zener diodes are included in such a parallel connection acting as a voltage limitation means, the lower is the probability that the voltage limitation means is not effective in the case of hazard.

Provisions are made in one embodiment of the supply circuit for this supply circuit to have one or more inverse diodes on the input side, i.e., in front of the boost converter when viewed from the voltage source. The at least one inverse diode is effective in limiting the voltage rise over the coil based on the self-induction that becomes established when opening the circuit element of the boost converter. Briefly, if the voltage drop over the at least one inverse diode is left out of consideration, it can be determined that the inverse diode or each inverse diode causes the potential at the contact point of the inverse diode(s) and the coil not to be able to drop below ground potential. The voltage at the output of the boost converter is thus effectively limited. This limitation ensures that the self-induction becoming established during the switching of the circuit element and the current flow brought about thereby cannot lead to a critical situation, especially not to an ignition in an atmosphere with explosion hazard. A possible plurality of inverse diodes combined with one another in a parallel connection is suitable, as was already described above for the voltage limitation means, for ensuring the effectiveness of the protective circuit given by the inverse diode(s) even if individual inverse diodes or a plurality of inverse diodes are defective. If, for example, one of the two inverse diodes in a parallel connection of two inverse diodes has a high ohmic resistance in the conducting direction as well, one such individual defective inverse diode could not guarantee the defined potential at the input of the boost converter. If at least one of the inverse diodes is functioning properly in this parallel connection or in a parallel connection with additional inverse diodes, this protective circuit is, on the whole, effective.

A thermal cutout is provided between the inverse diode or each inverse diode, on the one hand, and the boost converter, on the other hand, in another embodiment of the supply circuit. The circuit of the boost converter is prevented hereby from glow ignitability. The thermal cutout is coupled thermally well with the circuit element of the boost converter and correspondingly triggers in case of overheating of the circuit element.

Provisions are made in yet another embodiment of the supply circuit for said supply circuit to have a plurality of tapping sites protected resistively each individually for tapping a corresponding output voltage. Independent circuits can be connected to such tapping sites and identical or even different output voltages can be tapped. Due to the respective tapping sites being protected resistively, a central resistive protection, for example, between the power source and the boost converter, can be eliminated. It is thus possible to draw even more power from the respective power source.

Provisions are made in one embodiment of the supply circuit for the supply circuit to be enclosed or embedded in an encapsulation, especially a sealing medium, which surrounds it on all sides. This prevents any contact with an atmosphere that may possibly have an explosion hazard.

The above-mentioned object is also accomplished with protective headgear of the type mentioned in the introduction, which has a communication system with a power source associated with the protective headgear for the communication system, by the communication system comprising a supply circuit as described here and below for supplying the communication system from the power source.

Since protective headgear of the type defined in the introduction muffles especially high-frequency speech components, markedly better intelligibility of speech can be achieved by adequately positioning the microphone, namely, in the area of a connection for a compressed air breathing apparatus, i.e., directly in front of the mouth of the user of the protective headgear. One embodiment of the protective headgear is consequently characterized by a microphone positioned in the area of the connection for the compressed air breathing apparatus.

The above-mentioned object is likewise accomplished with a method for operating the supply circuit described here and below by a preset supply voltage being generated for the supply of a communication system of protective headgear with electric power during the operation of the supply circuit with the boost converter comprised thereby during continuing discharge of the power source by a corresponding actuation of the boost converter over a broader discharge range of the power source. A broader discharge range is defined here as a discharge range that goes beyond the discharge range in case of direct tapping of the supply voltage from the corresponding power source, i.e., especially a battery or a plurality of batteries.

An exemplary embodiment of the present invention will be explained in more detail below on the basis of the drawings. Subjects or elements that correspond to each other are designated by the same reference numbers in all figures.

The exemplary embodiment or each exemplary embodiment shall not be construed as a limitation of the present invention. Variants and modifications are rather possible within the framework of the present disclosure, these being especially variants and combinations which the person skilled in the art can identify for accomplishing the object, for example, by a combination or modification of individual features and elements or process steps that are described, for example, in the general or special part of the specification and are contained in the claims and/or the drawings and lead to a new subject or to new process steps or sequences of process steps, also insofar as these pertain to testing and working methods, by features that can be combined with one another.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a block diagram of a communication system comprised by protective headgear;

FIG. 3 is a supply circuit;

FIG. 4 is a discharge curve of two batteries connected in series;

DESCRIPTION OF THE PREFERRED EMBODIMENTS

Figure 1:
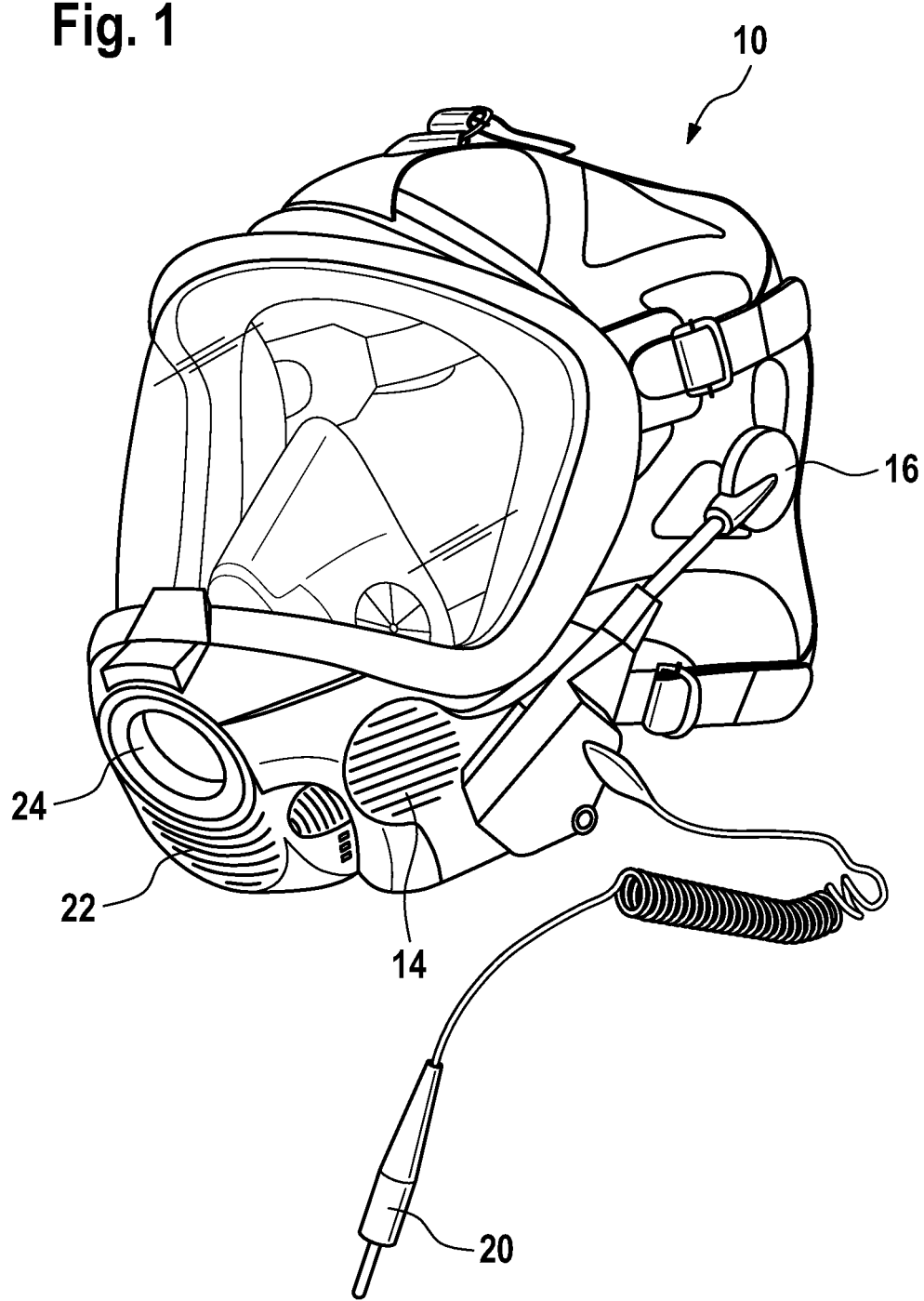
FIG. 1 is a full face mask as an example of protective headgear.

Referring to the drawings in particular, FIG. 1 shows a so-called full face mask as an example of protective headgear 10, as it is in the foreground here. A mask communication system designated here and below by 112 (FIG. 2) for short is integrated here in the protective headgear 10, namely, in the outer contour of the protective headgear 10. Loudspeaker 14 is located on one side or on both sides of the protective headgear 10 as components of the communication system 112. In addition, an earphone 16 (it is also possible to provide two earphones if necessary), which can reproduce the signal of a tactical radio equipment 18 (FIG. 2) at the ear of the user of the protective headgear 10, can be recognized. The connection with the radio equipment 18, which the user of the protective headgear 10 brings along with him in a suitable manner, for example, on a belt, is brought about by means of a cable 20, and a microphone 22 for receiving the speech signal is located in the interior of the mask directly in front of the mouth of the user of the protective headgear 10 in the area of a connection 24 for a compressed air breathing apparatus (not shown). The speech signal received by microphone 22 is outputted via the loudspeaker or each loudspeaker 14 and/or passed on via the radio equipment 18 to additional radio equipment and from there, for example, to the protective headgears 10 of other members of the rescue team.

FIG. 2 shows for this a block diagram of a communication system 112 comprised by the protective headgear 10 with the two loudspeakers, namely, at least one loudspeaker 14 turned towards the outside and with an earphone 16, and the microphone 22 as well as the radio equipment 18 connected to the communication system 112 via cable 20.

Electrical devices, which are used as accessories during firefighting or in other hazardous situations, are normally designed such that there is no risk in case of a defect that these would cause a flammable atmosphere to ignite. To optimally protect the user of protective headgear 10, it must be assumed that the most adverse circumstances can occur, i.e., that defects may also occur in the communication systems 112.

Batteries, as they are usually used in such systems, definitely imply the risk of releasing larger quantities of electric power, which would immediately bring about the ignition of an explosive atmosphere. The electric power that can be derived by a passive electrical component, namely, at least one current-limiting resistor 26, is therefore limited, as this is schematically shown in FIG. 3 in a simplified manner on the basis of a supply circuit 128 with two batteries (primary batteries) 30, 32 connected in series. In addition to the current-limiting resistor 26, the supply circuit 128 may also comprise a cutout 34. If the supply circuit 128 comprises one or more ohmic current-limiting resistors 26, on the one hand, and a cutout 34, on the other hand, the two elements bring about a resistive current limitation, namely, by the internal resistance of the cutout 34 (F1), on the one hand, and by the ohmic resistance of the current-limiting resistor 26 (R1), on the other hand. Cutout 34 limits the mean current, which flows into the communication system 112, and offers protection against an excessively intense heating, which could lead to glow ignition.

However, the problem that electronic components of the communication system 112 function reliably only above a certain voltage arises especially clearly in case of power supply with batteries 30, 32 or another similar power source that is associated with the protective headgear 10 or can be carried out by the protective headgear 10. To ensure, for example, the function of an amplifier (not shown) for the loudspeaker 14, the battery voltage must be higher than 2.3 V, so that an output of about 1 W of the amplifier for the loudspeaker 14 is still possible.

However, the batteries 30, 32 used still have more than one third of their chemically bound power after a partial discharge at a residual battery voltage of 2.3 V, i.e., at this point of discharge that is critical for the operation of the communication system 112. For firefighting and the environment this means that batteries 30, 32 must be replaced clearly before the end of their useful life, which leads to high costs. In addition, the performance capacity of the speech amplifier drops markedly already above this critical point, because the maximum voltage with which the amplifier is operated is dropping continuously and speech amplification is this reduced.

FIG. 4 illustrates this aspect on the basis of a discharge curve 36 for two type AAA batteries 30, 32 (primary batteries) connected in series. The depth of discharge in percentage from 0% to 100% is plotted on the abscissa. The electric voltage in V that can be tapped via the series connection of the two primary batteries is plotted on the ordinate. First, second and third working points 38, 40, 42 are highlighted on the discharge curve 36. The first working point 38 marks a discharge of the two primary batteries, at which a total voltage of 2.5 V can still be tapped over the series connection of these batteries. If this is the minimum voltage for the operation of the communication system 112, only about 30% of the electric power being stored chemically in the primary batteries can be utilized. The second working point 40 marks a discharge of the two primary batteries at which a total voltage of 2.3 V can still be tapped via the series connection of these batteries. If this is the minimum voltage for the operation of the communication system 112, approximately 63% of the electric power being stored chemically in the primary batteries can still be used. However, one third of the electric power being stored continues to be unused. The third working point 42 marks a discharge of the two primary batteries at which a total voltage of 2 V can still be tapped via the series connection of these batteries. If this is the minimum voltage for the operation of the communication system 112, nearly the total amount of electric power being stored chemically in the primary batteries, namely, more than 90%, can be used.

Figure 7:
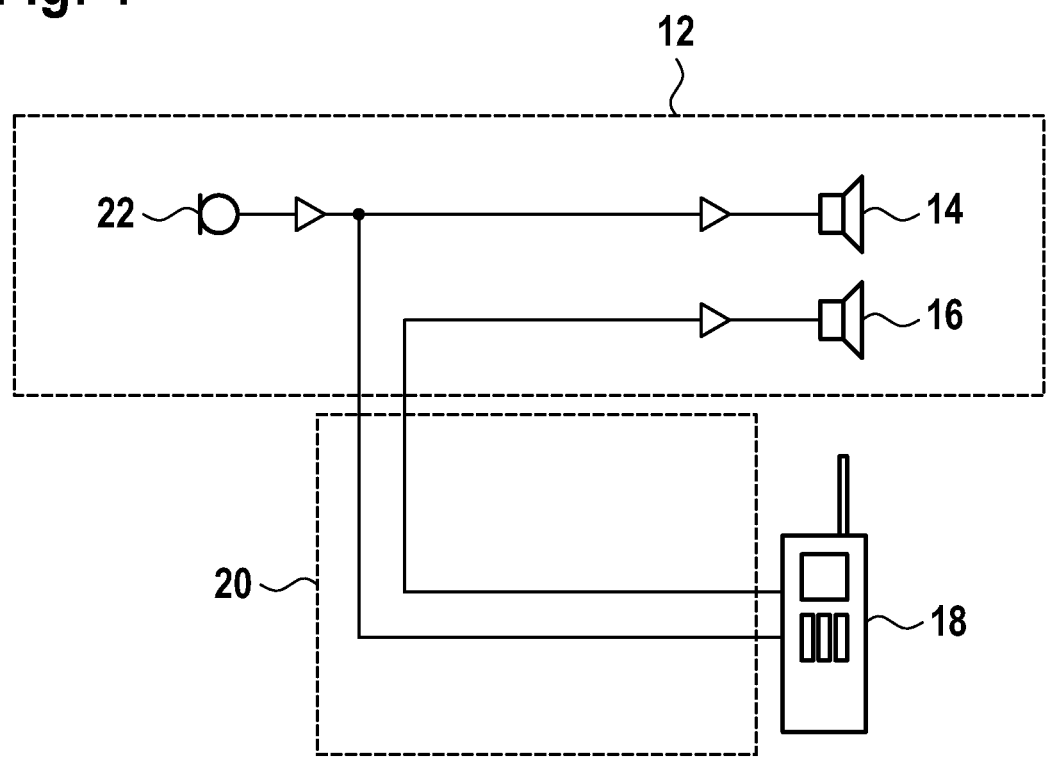
FIG. 7 is a block diagram of a communication system according to the present invention comprised by protective headgear.

However, the minimum voltage necessary for the operation of the communication system 112 cannot, in fact, be readily affected. The present invention correspondingly proposes better utilization of the electric power supplied by the batteries 30, 32. FIG. 7 shows a block diagram of a communication system 12 according to the invention comprised by the protective headgear 10 with the two loudspeakers, namely, at least one loudspeaker 14 turned towards the outside and with an earphone 16, and the microphone 22 as well as the radio equipment 18 connected to the communication system 12 via cable 20.

Figure 5:
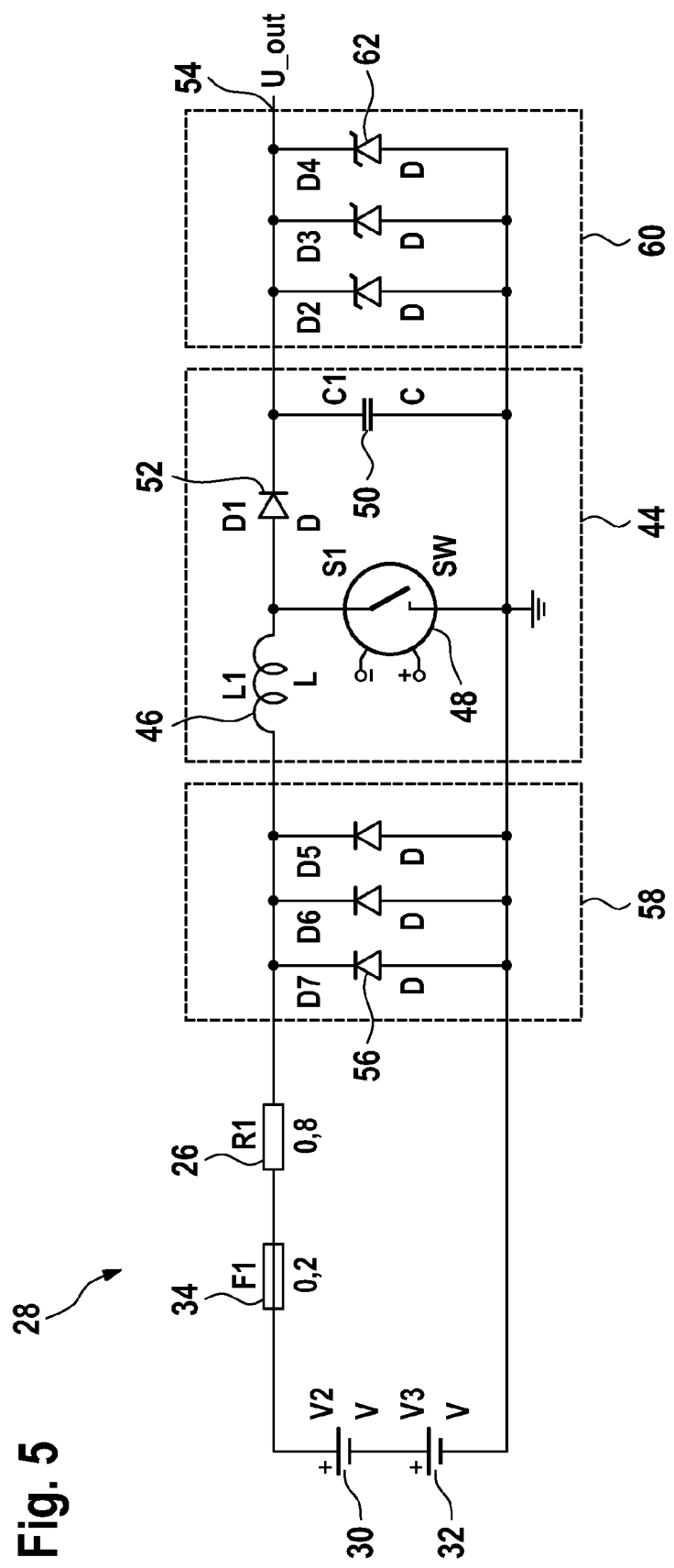
FIG. 5 is an embodiment of a supply circuit according to the present invention for a communication system of the type shown in FIG. 2.

Better utilization of the electric power supplied by the batteries 30, 32 is brought about with a supply circuit 28, as it is shown in FIG. 5. This comprises as an essential component a boost converter 44, which is basically known per se, with a coil 46 (L1), a switching circuit element 48 (SW), especially an electronic circuit element 48 in the form of a transistor or MOSFET transistor, and a capacitor 50 (C1). A recovery diode 52 (D1) is connected in series with coil 46. Circuit element 48 is connected to a center tap between coil 46 and recovery diode 52.

The output voltage is boosted by the capacitor 50 storing and adding up the electric power supplied by coil 46 during the operation of boost converter 44. Coil 46 is connected to ground by the circuit element 48 repeatedly, especially periodically. The input voltage, i.e., the voltage supplied by the batteries 30, 32 (at the input), is in this case present on coil 46. The current flowing through coil 46 and hence the power being stored in the magnetic field rise. As soon as circuit element 48 is opened, the self-inductivity of coil 46 brings about continuation of the current flow. The voltage at the output-side end of coil 46 rises vary rapidly until it exceeds the voltage present on capacitor 50 and recovery diode 52 opens. The current then continues to flow unchanged and continues to charge capacitor 50. The magnetic field of coil 46 is now reduced and it releases its power by driving the current over the recovery diode 52 into capacitor 50. An output voltage (U_out) that is increased—boosted relative to the input voltage supplied by the batteries 30, 32 can thus be tapped via capacitor 50 at an output-side tapping site (output) 54.

Since the current flowing through coil 46 is not extinguished during the opening of circuit element 48 but continues to flow based on the self-inductivity in a simple boost converter 44, on which the input voltage is directly present on the output side, coil 46 becomes the voltage source, whose voltage can become infinitely high in the ideal case. Such an arrangement can easily cause a flammable mixture to explode in case of a defect.

To prevent this, provisions are made for the supply circuit 28 to comprise redundant inverse diodes 56 (D5-D7) as input-side protective circuit 58, which carry the current when the circuit element 48 is opened. In addition or as an alternative, provisions are made for the supply circuit 28 to have on the output side a voltage limitation means (voltage limiter) 60 as an output-side protective circuit, which comprises a plurality of Zener diodes 62 (D2-D4) in the exemplary embodiment being shown. The output current is limited by the voltage limitation means 60, because if the output current exceeds the Zener threshold of the Zener diode 62 or one of the Zener diodes 62, the output current flows against ground via the corresponding Zener diode 62 or each corresponding Zener diode 62 until capacitor 50 is discharged.

The number of diodes 56, 62 in the input-side and/or output-side protective circuit, i.e., the protective circuit in front of and after the boost converter 44, depends only on the desired error tolerance and can also have a simple design for a lower level of safety. If, moreover, the switching frequency of circuit element 48 of the boost converter 44 is selected to be so high that only comparatively low inductivities are needed, the inverse diode(s) 56 may especially also be omitted altogether.

Circuit element 48 of the boost converter is actuated in a manner known per se by a regulating means, not shown, which compares the respective output voltage U_out with a preset nominal voltage and varies the switching frequency of circuit element 48 in a suitable manner depending on a deviation between the output voltage and the desired voltage.

A supply circuit 28 based on the principle shown in FIG. 5 makes it possible to ensure a power of 1 W at a battery voltage as low as 2 V for supplying the communication system 12 with 3.3 V and to prevent ignition with certainty even in an explosive atmosphere even in case of a defect. The batteries are utilized up to 90% in this manner. In addition, an always constant performance capacity of the system is achieved by the use of this technique.

To improve the freedom of movement of the corresponding user of the protective headgear 10, the cable connections 20 to the tactical radio equipment 18 are often replaced with a wireless connection. However, the drawback of such solutions is the increased power demand, which can be largely compensated by increasing the voltage and regulating the voltage by means of boost converter 44.

Figure 6:
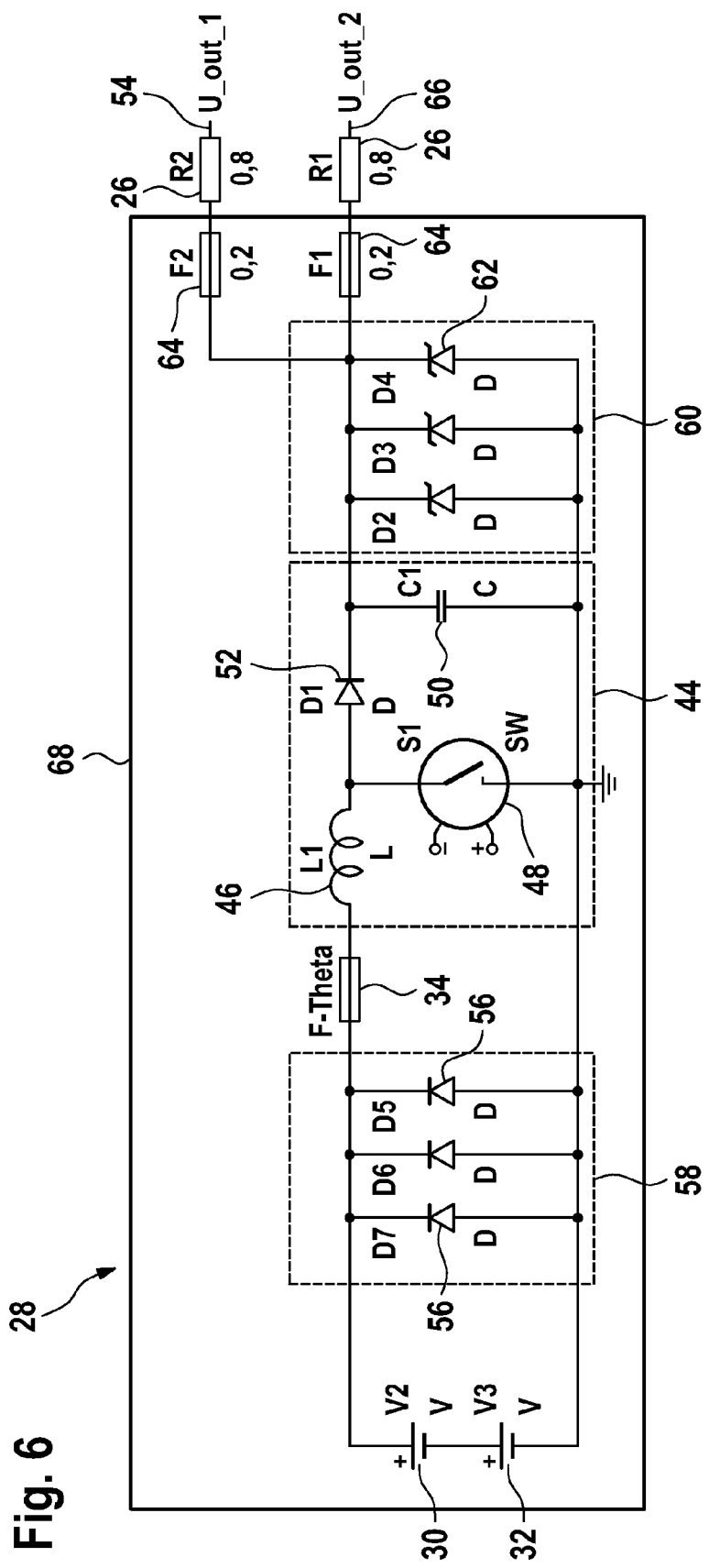
FIG. 6 is another and complemented embodiment of the supply circuit according to FIG. 5.

The embodiment variant of the supply circuit 28 shown in FIG. 6 makes it possible to derive even more power from the batteries 30, 32. A single boost converter 44 is used here, which has the same protective mechanisms 56, 58, 60, 62 as the implementation explained above on the basis of FIG. 5. However, the current that is connected by the supply circuit 28 is not limited resistively. To effectively prevent a spark ignition from occurring, a plurality of individual circuits limited resistively by resistors 26 (R1, R2) are connected to the output of supply circuit 28. In addition, glow ignitability is prevented by a cutout 34 connected in series with the boost converter 44 in the form of a thermal cutout (thermal fuse), which has good thermal coupling with circuit element 48 of the boost converter 44. A separate cutout 64 is possibly also provided on the output side in each circuit in series with the respective resistor 26.

The result is a supply circuit 28 with a first tapping site 54, at which a first output voltage U_out_1 can be tapped, and with a second tapping site 66, at which a second output voltage U_out_2 can be tapped. Further tapping sites can be embodied according to the same principle. Thus, two or more circuits, which permit a higher power in total, can be supplied in a communication system 12 with a boost converter 44.

In an especially secure embodiment, the supply circuit 28, but at least the coil 46 and circuit element 48 thereof as well as the regulating means and the diodes 56, 62 are embedded in a sealing compound 68, especially a sealing medium, as a result of which circuit 28 is isolated from a potentially explosive atmosphere. This is shown in the drawings for the embodiment of the supply circuit 28 according to FIG. 6, but it may just as well be considered for the embodiment according to FIG. 5.

Individual prominent aspects of the specification being filed here can thus be briefly summarized as follows: What is proposed is at first a supply circuit 28 in a communication system 12 of protective headgear 10 for supplying the communication system 12 from a power source 30, 32 associated with the protective headgear 10, wherein the supply circuit 28 comprises a boost converter 44 for better utilization of the electric power supplied by the power source 30, 32. Furthermore, protective headgear 10 with such a supply circuit 28 for supplying a communication system 12 comprised by the protective headgear 10 and a method for operating such a supply circuit 28 are proposed.

While specific embodiments of the invention have been shown and described in detail to illustrate the application of the principles of the invention, it will be understood that the invention may be embodied otherwise without departing from such principles.

APPENDIX

| LIST OF REFERENCE NUMBERS | |
|---|---|
| 10 | Protective headgear |
| 14 | Loudspeaker |
| 16 | Earphone |
| 18 | Radio equipment |
| 20 | Cable |
| 22 | Microphone |
| 24 | Connection for compressed air breathing apparatus |
| 12 | Communication system |
| 26 | Current-limiting resistor |
| 28 | Supply circuit |
| 30 | Battery |
| 32 | Battery |

APPENDIX-continued

LIST OF REFERENCE NUMBERS

| | |
|---|---|
| 34 | Cutout |
| 36 | Discharge curve |
| 38, 40, 42 | First, second, third working point |
| 44 | Boost converter |
| 46 | Coil |
| 48 | Circuit element |
| 50 | Capacitor |
| 52 | Recovery diode |
| 54 | (First) tapping site |
| 56 | Inverse diode |
| 58 | Input-side protective circuit |
| 60 | Voltage limitation means/output-side protective circuit |
| 62 | Zener diode |
| 64 | Cutout |
| 66 | Second tapping site |
| 68 | Sealing compound |
| 128 | Supply circuit |

What is claimed is:

1. A protective headgear communication system supply circuit comprising:
a power source;
a supply circuit input connected to the power source;
a supply circuit output;
a protective headgear communication system connected to the supply circuit output;
a boost converter connected between the input and the output;
a voltage limiter connected between the boost converter and the output;
an inductor in the boost converter;
an inverse diode connected between the boost converter and the input, the inverse diode being arranged to prevent an input side of the inductor from going below a predetermined potential.

2. A supply circuit in accordance with claim 1, wherein the voltage limiter comprises a Zener diode.

3. A supply circuit in accordance with claim 1, further comprising a thermal cutout between the inverse diode and the boost converter.

4. A supply circuit in accordance with claim 3, wherein the supply circuit output comprises a plurality of tapping sites for tapping a respective output voltage, each of the tapping sites being protected by a resistive protector.

5. A supply circuit in accordance with claim 1, further comprising an encapsulation surrounding the supply circuit.

6. A supply circuit in accordance with claim 5 wherein the encapsulation comprises a sealing medium and the supply circuit is embedded in the sealing medium.

7. A supply circuit in accordance with claim 1, wherein the power supply comprises a plurality of batteries connected in series.

8. A protective headgear system comprising:
a protective headgear unit;
a protective headgear communication system; and
a protective headgear communication system supply circuit for supplying power to the protective headgear communication system from a power source associated with the protective headgear unit, wherein the communication system comprises a supply circuit input connected to the power source, a supply circuit output and a boost converter connected between the input and the output, the protective headgear communication system supply circuit further comprising a voltage limiter connected between the boost converter and the output;
an inductor in the boost convertor;
an inverse diode connected between the boost converter and the input, the inverse diode being arranged to prevent an input side of the inductor from going below a predetermined potential.

9. A protective headgear system in accordance with claim 8, wherein the voltage limiter comprises a Zener diode.

10. A protective headgear system in accordance with claim 8, further comprising a thermal cutout between the inverse diode and the boost converter.

11. A protective headgear system in accordance with claim 10, wherein the supply circuit output comprises a plurality of tapping sites for tapping a respective output voltage, each of the tapping sites being protected by a resistive protector.

12. A protective headgear system in accordance with claim 8, further comprising an encapsulation surrounding the supply circuit, wherein the encapsulation comprises a sealing medium and the supply circuit is embedded in the sealing medium.

13. A protective headgear system in accordance with claim 8, wherein the power supply comprises a plurality of batteries connected in series.

14. A protective headgear system comprising:
a mask with a connection to a respirator;
a communication system incorporated into said mask;
a supply circuit adapted to receive a varying input voltage at an input of said supply circuit, said supply circuit including a boost converter connected to said input and raising the varying input voltage to an output voltage at an output of said supply circuit, the output voltage having a predetermined set value, said supply circuit including a voltage limiter connected to said output and limiting the output voltage to a limit voltage, said boost converter including an inductor storing power from said input and releasing the stored power to add to the input voltage to raise the input voltage to the output voltage;
an inverse diode connected to said input of said supply circuit, said inverse diode being arranged to prevent an input side of said inductor from going below a predetermined potential.

15. A protective headgear system in accordance with claim 14, wherein:
said mask is adapted to be used in an explosive atmosphere;
said limit voltage is below a value causing ignition in the explosive atmosphere.

16. a protective headgear system in accordance with claim 15, wherein:
said supply circuit is configured to receive the varying input voltage from batteries carried by user of the protective headgear system.

* * * * *